United States Patent
Semenov et al.

(10) Patent No.: US 12,533,965 B2
(45) Date of Patent: Jan. 27, 2026

(54) ONE-PEDAL DRIVE CONTROL ON GRADE

(71) Applicant: FORD GLOBAL TECHNOLOGIES, LLC, Dearborn, MI (US)

(72) Inventors: Sergey Gennadievich Semenov, Farmington Hills, MI (US); Richard B Eckenrode, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 187 days.

(21) Appl. No.: 18/481,332

(22) Filed: Oct. 5, 2023

(65) Prior Publication Data
US 2025/0115138 A1    Apr. 10, 2025

(51) Int. Cl.
*B60L 15/20* (2006.01)

(52) U.S. Cl.
CPC ..... *B60L 15/2018* (2013.01); *B60L 2240/423* (2013.01); *B60L 2240/642* (2013.01); *B60L 2250/26* (2013.01)

(58) Field of Classification Search
CPC ........... B60L 15/2018; B60L 2240/423; B60L 2240/642; B60L 2250/26; B60L 7/18; B60L 2240/12; Y02T 10/72
See application file for complete search history.

(56) References Cited

U.S. PATENT DOCUMENTS

| 11,285,950 B1 | 3/2022 | Bolger et al. |
| 2022/0080971 A1 | 3/2022 | Bolger et al. |
| 2022/0089154 A1 | 3/2022 | Bolger et al. |
| 2022/0097706 A1 | 3/2022 | Bolger et al. |
| 2022/0176827 A1 | 6/2022 | Otanez et al. |

FOREIGN PATENT DOCUMENTS

KR    20220040548    * 9/2022

OTHER PUBLICATIONS

Machine Translation of Korean Patent Publication KR 20220040548 (Year: 2022).*

* cited by examiner

*Primary Examiner* — Alan D Hutchinson
(74) *Attorney, Agent, or Firm* — David B. Kelley; Brooks Kushman P.C.

(57) ABSTRACT

A vehicle includes an electric machine that propels the vehicle, and a controller that, while wheels of only one axle of the vehicle are on a ramp being entered and climbed by the vehicle and a first ramp compensation torque is being commanded to the electric machine, reduces the first ramp compensation torque responsive to a rate of increase of the first ramp compensation torque exceeding a first rate threshold.

15 Claims, 3 Drawing Sheets

ONE-PEDAL DRIVE CONTROL ON GRADE

TECHNICAL FIELD

The present disclosure relates to one-pedal drive vehicle control on a graded surface.

BACKGROUND

Hybrid/electric vehicles may include one-pedal drive systems that are configured to brake the vehicle through regenerative braking in response to releasing the accelerator pedal and without application of the brake pedal.

SUMMARY

A vehicle includes an electric machine configured to propel the vehicle; and a controller programmed to, while wheels of only one axle of the vehicle are on a ramp being entered and climbed by the vehicle and a first ramp compensation torque is being commanded to the electric machine, reduce the first ramp compensation torque responsive to a rate of increase of the first ramp compensation torque exceeding a first rate threshold.

A method includes applying a first ramp compensation torque to an electric machine of a vehicle operating in a one-pedal drive mode while entering a ramp climb, and responsive to a rate of increase of the first ramp compensation torque exceeding a first rate threshold, reducing the first ramp compensation torque such that the rate becomes less than the first rate threshold.

A powertrain system of a vehicle includes a controller programmed to, while operating the vehicle in a one-pedal drive mode, responsive to detecting front wheels of the vehicle having entered a ramp while rear wheels of the vehicle not having entered the ramp, command a first torque compensation to an electric machine, and responsive to an increase of the first torque compensation at a rate exceeding a first threshold, reduce a magnitude of the first torque compensation until the rear wheels have entered the ramp.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
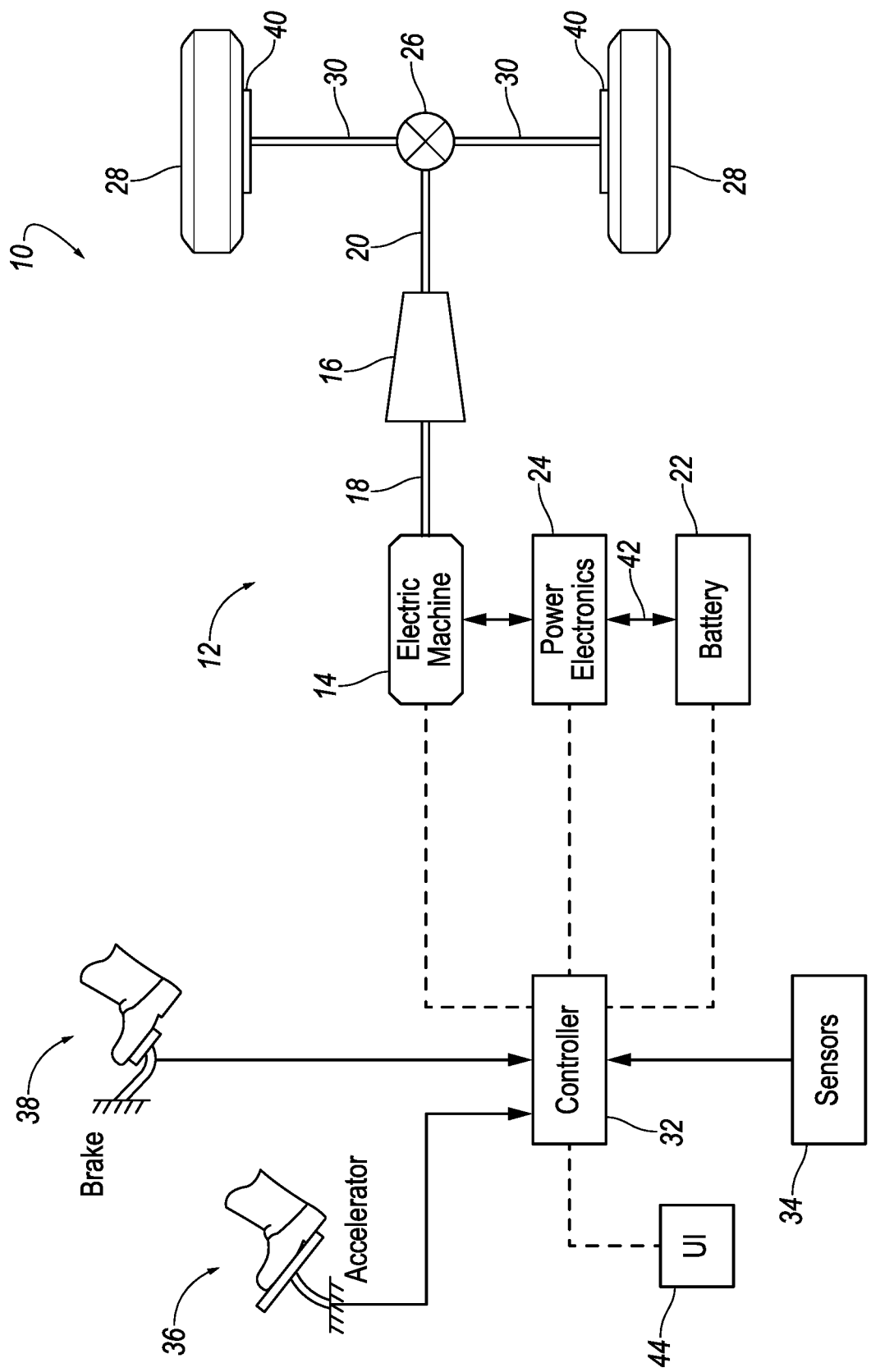
FIG. 1 is a schematic illustration of a representative powertrain of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 may include a powertrain 12. The powertrain 12 may include an electric machine 14 (e.g., an electric motor/generator) that drives a transmission (or gearbox) 16. More specifically, the electric machine 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the electric machine 14 and the transmission 16. Alternatively, the transmission 16 may be a multiple step-ratio automatic transmission. An associated traction battery 22 may be configured to deliver electrical power to or receive electrical power from the electric machine 14.

The electric machine 14 may be a drive source for the electric vehicle 10 that is configured to propel the electric vehicle 10. The electric machine 14 may be implemented by various types of electric machines. For example, the electric machine 14 may be a permanent magnet synchronous motor. Power electronics 24 may condition direct current (DC) power provided by the traction battery 22 to the requirements of the electric machine 14, as will be described below. For example, the power electronics 24 may provide three phase alternating current (AC) to the electric machine 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements may be controllable through a shift schedule that connects and disconnects certain elements of the gear sets to control the ratio between the transmission output shaft 20 and the transmission input shaft 18. The transmission 16 may be automatically shifted from one ratio to another based on various vehicle and ambient operating conditions by an associated controller, such as a powertrain control unit (PCU) (not shown). Power and torque from the electric machine 14 may be delivered to and received by transmission 16. The transmission 16 then may provide powertrain output power and torque to the output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., the electric machine 14) and then provides torque to an output shaft (e.g., the output shaft 20) at the different ratios is acceptable for use with embodiments of the present disclosure. For example, the transmission 16 may be implemented by a continuously variable transmission (CVT) operated by one or more pulleys. Alternatively, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 may be connected to a differential 26. The differential 26 may drive a pair of drive wheels 28 via respective axles 30 connected to the differential 26. The differential 26 may transmit approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The electric machine 14 may be configured to deliver power to the wheels 28 to drive the vehicle 10 via the various connections described above. It should be understood that the connections between the electric machine 14 and the wheels 28 described herein are for illustrative purposes only and that other drivetrain configurations between the electric machine 14 and the wheels 28 may be implemented in the alternative.

The powertrain 12 may further include an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the electric machine 14 to provide wheel torque or charge the battery 22, select or schedule transmission shifts, etc.

The controller 32 may include a microprocessor/processor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle. The powertrain 12 may further include or connect to vehicle sensors 34 configured to provide sensor data to the controller 32. As a few non-limiting examples, the sensors 34 may include one or more wheel speed sensors configured to provide the controller 32 (e.g., an anti-lock brake controller) with rotation speed data of the one or more wheels 28. The sensors 34 may further include one or more tilt sensors (e.g., gyroscope) configured to provide the controller 32 with tilt and inclination data of the vehicle body. For instance, tilt data in the longitudinal direction may be used to determine torque compensation (e.g., in the 1PD mode).

The controller 32 may communicate with various vehicle sensors 34 and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 32 may communicate signals to and/or receive signals from the electric machine 14, traction battery 22, transmission 16, power electronics 24, sensors 34, and any another component of the powertrain 12 that may be included, but is not shown in FIG. 1 (e.g., a launch clutch that may be disposed between the electric machine 14 and the transmission 16.) Although not explicitly illustrated, those of ordinary skill in the art will recognize various functions or components that may be controlled by the controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, electric machine operation, clutch pressures for the transmission gearbox 16 or any other clutch that is part of the powertrain 12, and the like. As introduced above, the sensors 34 communicating input through the I/O interface may be used to indicate wheel speeds, vehicle speed, vehicle weight, coolant temperature, accelerator pedal position, ignition switch position, ambient air temperature (e.g., ambient air temperature sensor), transmission gear, ratio, or mode, transmission oil temperature, transmission input and output speed, shift mode, battery temperature, voltage, current, or state of charge (SOC) for example.

Control logic or functions performed by the controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as the controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 36 may be used by the driver of the vehicle 10 to provide a demanded torque, power, or drive command to the powertrain 12 (or more specifically the electric machine 14) to propel the vehicle 10. In general, depressing and releasing the accelerator pedal 36 generates an accelerator pedal position signal that may be interpreted by the controller 32 as a demand for increased power or decreased power, respectively. Stated in other terms, increasing an amount of depression of the accelerator pedal may be configured to generate a command to increase the speed of the vehicle 10 while decreasing an amount of depression of the accelerator pedal may be configured to generate a command to decrease the speed of the vehicle 10. A brake pedal 38 may be also used by the driver of the vehicle to provide a demanded braking torque to slow or decrease the speed of the vehicle. In general, depressing the brake pedal 38 may generate a brake pedal position signal that may be interpreted by the controller 32 as a demand to decrease the vehicle speed. Based upon inputs from the accelerator pedal 36 and brake pedal 38, the controller 32 may command the torque and/or power to the electric machine 14, and friction brakes 40. The friction brakes 40 may be configured to apply torque to the wheels in response to depression of the brake pedal 38 in order to slow or brake the vehicle 10. The controller 32 also controls the timing of gear shifts within the transmission 16.

The electric machine 14 may operate as a motor to provide a driving force for the powertrain 12. To drive or propel the vehicle with the electric machine 14 the traction battery 22 may transmit stored electrical energy through wiring 42 to the power electronics 24 that may include an inverter, for example. The power electronics 24 may then convert DC voltage from the battery 22 into AC voltage to be used by the electric machine 14. The controller 32 may command the power electronics 24 to convert the DC voltage from the battery 22 to the AC voltage provided to the electric machine 14 to provide positive or negative torque to the input shaft 18.

The electric machine 14 may also operate as a generator and convert kinetic energy from the powertrain 12 into electric energy to be stored in the traction battery 22. More specifically, the electric machine 14 may operate as a generator during times of regenerative braking in which torque and rotational (or kinetic) energy from the spinning wheels 28 is transferred back through the transmission 16 and is converted into electrical energy for storage in the traction battery 22. Regenerative braking may also result in slowing or braking the vehicle.

It should be understood that the schematic illustrated in FIG. 1 is merely representative and is not intended to be limiting. Other configurations may be contemplated without deviating from the scope of the disclosure. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine (not shown) such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), vehicle weight, etc.

The vehicle 10 may include a one-pedal drive (1PD) mode. In the one-pedal drive mode, the speed of the vehicle 10 may be increased in response to increasing a depressed position of the accelerator pedal 36 while releasing the accelerator pedal 36 may result in breaking the vehicle 10 via regenerative braking through the electric machine 14. More specifically, the vehicle 10 may be slowed or braked via releasing the accelerator pedal 36 alone without an application or depression of the brake pedal 38. If the vehicle 10 has come to a stopped position where the vehicle speed is zero, it may be desirable to ensure that the vehicle 10 remains at zero speed in the event the vehicle operator has not applied the brake pedal 38 in one-pedal drive mode once the vehicle has obtained zero speed. The vehicle 10 may include a user interface 44, such as a control panel, touch screen, push button, etc. that is in communication with the controller 32. The controller 32 may be configured to enable and disable the one-pedal driving mode based on an operator selected input from the user interface 44.

Once the one-pedal drive mode is activated, torque compensation may be determined using inclination data (e.g., measured via the tilt sensor 34) and/or acceleration data (e.g., measured via the acceleration sensor 34) and applied to vehicle wheels to provide a more natural driving feeling to the driver. For instance, smooth vehicle driving in the one-pedal drive mode may take into account a feedforward (FF) signal reflecting a road grade and a feedback (FB) signal reflecting noise factors. The feedforward and feedback signals may be in the form of torques calculated and processed by the controller 32 based on sensor data received from the one or more sensors 34. For instance, the road grade feedforward torque may be calculated by the controller 32 using data received from the tilt sensor 34 or the like. Alternatively, the feedforward signal indicative of a road grade may be estimated by the controller 32 using longitudinal tilt or vehicle longitudinal acceleration compensated for gravity from an ABS module, or a difference between the actual rotational acceleration of each vehicle wheel 28 and the expected acceleration for the torque delivered at the wheel. Alternatively, the road grade may be obtained by the controller 32 via navigation controls configured to determine a vehicle location using satellite signals corresponding to digital map data reflecting the road grade recorded in a local storage of the vehicle 10. In general, the feedforward torque should be substantially zero when the vehicle travels on flat ground (i.e. no grade). The accelerator pedal map torque may be calibrated so that, on flat ground, the vehicle 10 would come to a complete stop with the driver's foot off any pedal. On a grade, the feedforward torque is non-zero and calculated such that the vehicle 10 would respond to the accelerator pedal the same way as when the vehicle 10 is on flat ground. The feedback torque should be close to zero assuming that the road surface quality and other noise factors that affect the correlation between the wheel torque and the vehicle speed are small.

When the vehicle 10 travels downhill (i.e. negative grade), a negative feedforward torque compensation may be generated by the controller 32 and applied to the vehicle wheels 28 to compensate a positive acceleration caused by the gravity of the vehicle 10 on the negative road grade. When the vehicle 10 travels uphill (i.e. positive grade), a positive feedforward torque may be generated by the controller 32 and applied to the vehicle wheels 28 to compensate a negative acceleration caused by the gravity of the vehicle 10 on the positive grade. The magnitude of the feedforward torque may increase as the absolute value of the grade increases, and decrease as the absolute value of the grade reduces.

Regardless of the grade being positive or negative, if the degree (e.g., inclination) of the grade is uniform, the feedforward torque compensation should be substantially unchanged throughout the traversing of the grade. However, if the degree of grade varies, the one-pedal drive mode may be overcompensated or undercompensated. For instance, the vehicle may require a different amount of grade compensation while entering and exiting a grade (e.g., a driveway) compared with traversing on the grade. The present disclosure proposes a method to address this situation.

Figure 2:
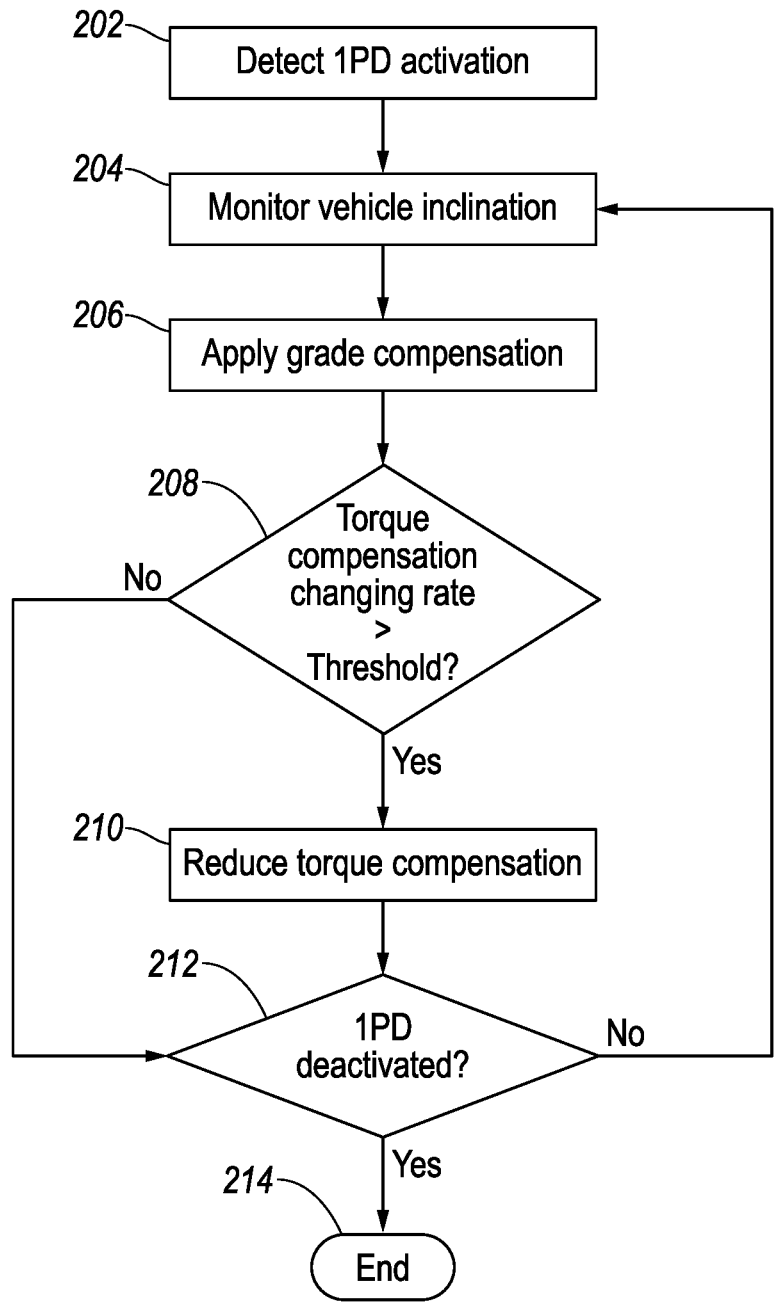
FIG. 2 is a flow diagram of a process for controlling one-pedal drive compensation.

Referring to FIG. 2, and example flow diagram of a process 200 for controlling the vehicle one-pedal drive compensation of one embodiment of the present disclosure is illustrated. With continuing reference to FIG. 1, the process 200 may be implemented via the controller 32 in combination with various sensors 34 of the vehicle 10. At operation 202, responsive to detecting the vehicle driver activating the one-pedal drive mode, the process proceeds to operation 204 to monitor vehicle inclination status in the longitudinal direction. At operation 206, the vehicle 10 determines and applies the feedforward torque compensation to vehicle driving wheels based on the inclination data.

As discussed above, the feedforward torque compensation may vary depending on the variation of the degree of the grade. As the feedforward torque compensation varies, the compensation changing rate over distance (or over time) may be determined and recorded by the controller 32. At operation 208, the controller 32 compares the present torque compensation changing rate with a threshold and determines if the magnitude of the changing rate exceeds the threshold which suggests an overcompensation. If the answer is no, the process proceeds to operation 212 and the vehicle 10 determines whether the vehicle driver has switched off the one-pedal drive mode. If the answer is a no indicating the vehicle 10 is still in the one-pedal drive mode, the process returns to operation 204 to continue monitoring the vehicle inclination and adjusting the amount of the grade compensation accordingly.

If the answer for operation 208 is a yes indicative of the feedforward torque compensation rate of change having exceeded the threshold, the process proceeds to operation 210 and the controller 32 adjusts the torque compensation by reducing the compensation amount which prevents overcompensation. The torque compensation changing rate exceeding the threshold often occurs in response to a significant road grade change. In these instances, continuing the original compensation amount may result in an overcompensation, making the driving experience feel unnatural. Reducing the compensation amount may alleviate the unnatural driving experience caused by overcompensation. The process proceeds to operation 212 after reducing the compensation at operation 210. At operation 212, responsive to detecting the user has deactivated the one-pedal drive mode, the process ends at operation 214.

Figure 3:
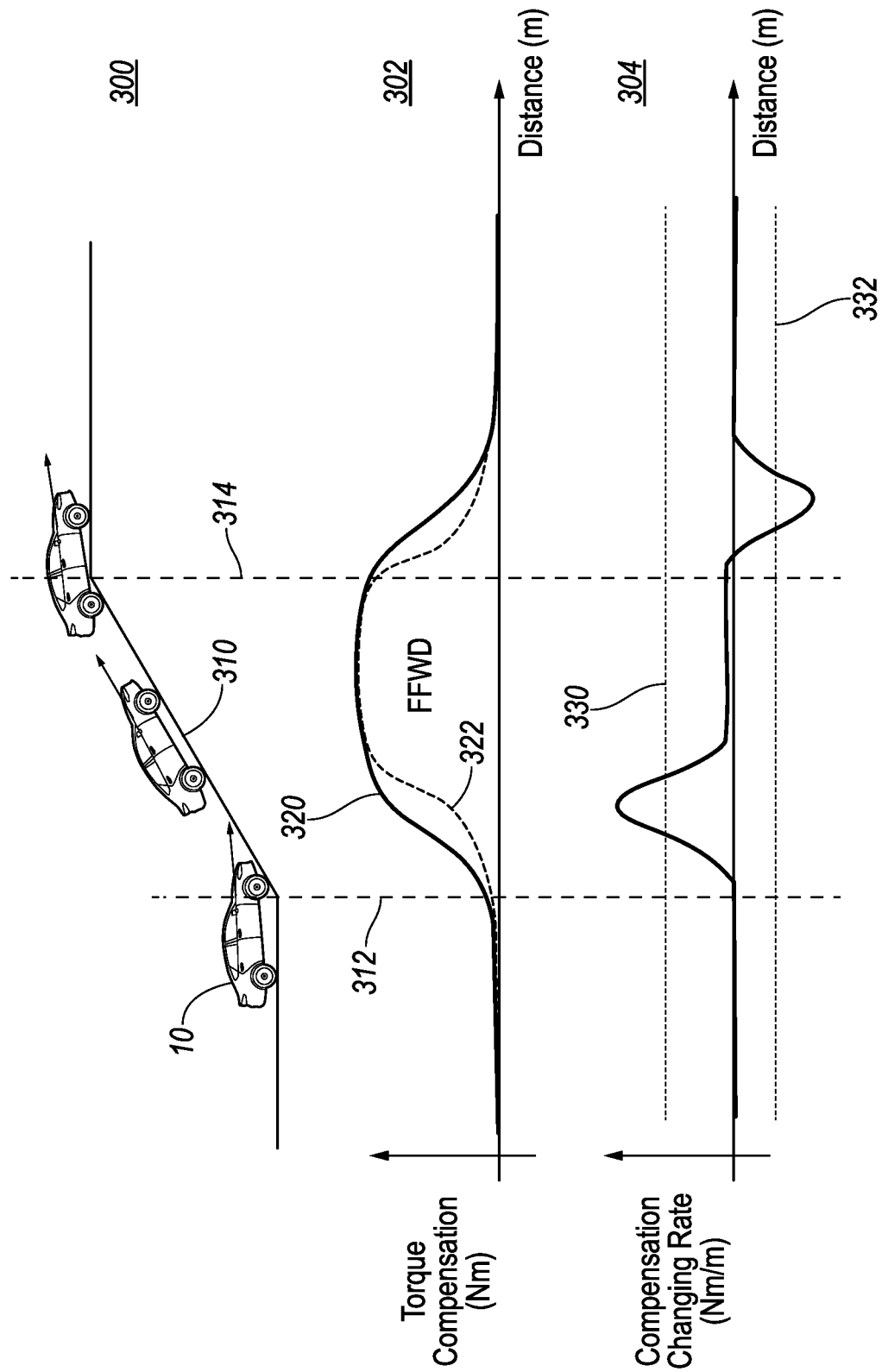
FIG. 3 is a schematic diagram of an example of the present disclosure.

The embodiments of the process 200 may be applied to various situations. Referring to FIG. 3, an example schematic diagram illustrates an application of the process 200. With continuing reference to FIGS. 1 and 2, FIG. 3 illustrates a schematic diagram 300 of a road grade, a waveform diagram 302 of a feedforward torque compensation, and a waveform diagram 304 of a torque compensation changing rate. In the present example, the vehicle 10 operates in the one-pedal mode from left to right toward a road grade (e.g., an uphill driveway) 310 starting an entering location 312 and ending at an exiting location 314. Before arriving at the entering location 312, the feedforward torque compensation as illustrated in diagram 302 is substantially zero as the road surface is flat. As the front wheels of the vehicle 10 enter the road grade 310 passing the entering location 312, the inclination and acceleration of the vehicle 10 in the longitudinal direction changes resulting in an automatic feedforward torque compensation operated by the controller 32 as illustrated in diagram 302. During the entering process, the front wheels of the vehicle 10 are on the grade while the rear wheels are still on the flat surface. As a result, the longitudinal vehicle inclination and acceleration varies throughout the entering process. More specifically, the inclination and acceleration along the longitudinal direction increase as the vehicle 10 drives forward until the rear wheels are also on the grade. The increased inclination and acceleration may result in an increased feedforward compensation applied by the controller 32.

Referring to diagram 302, the horizontal axis is indicative of distance traveled by the vehicle 10 in units of meter (m) corresponding to the road condition illustrated in diagram 300, and the vertical axis is indicative of the feedforward torque compensation applied to the driving wheels in units of Newton-meter (Nm). Two waveforms are illustrated in the diagram 302. The solid line denotes the original feedforward compensation without reduction adjustment, and the dashed line denotes the adjusted feedforward compensation. The variation of the original feedforward compensation during the entering process results in a positive changing rate of compensation as illustrated in diagram 304. The horizontal axis of the diagram 304 is indicative of the distance traveled by the vehicle 10 in units of meter (m), whereas the vertical axis of the diagram 304 is indicative of a compensation changing rate in units of Newton-meter/meter (Nm/m) which is equivalent to Newton (N). As illustrated in diagram 304, the compensation changing rate increases during the entering process of the vehicle 10, until the compensation changing rate exceeds an entering threshold 330 indicative of a rapid compensation change which may result in an overcompensation applied by the controller 32. As discussed above with reference to FIG. 2, in response to the compensation changing rate exceeding the entering threshold 330, the controller 32 adjusts the compensation by reducing the amount, which results in the adjusted waveform 322 illustrated in diagram 302. The adjusted compensation may provide the driver with a more natural driving experience in the one-pedal drive mode.

Continuing with FIG. 3, as the vehicle completes the entering process and all vehicle wheels are on the grade 310, the feedforward torque compensation stabilizes and the compensation changing rate reduces back within the entering threshold. In this case, no further compensation adjustments are needed. As illustrated in diagram 302, the original and adjusted torque compensation waveforms 320 and 322 start to converge after the entering process and substantially overlap while all front and rear wheels of the vehicle 10 traverse on the grade 310.

As the vehicle reaches the end of the grade 310 and starts to exit, the front wheels of the vehicle 10 exit the exiting location 314 first while the rear wheels are still on the grade 310. The controller 32 may reduce the feedforward torque compensation in response to the reduced longitudinal inclination and acceleration. The variation of the feedforward torque compensation results in a negative compensation changing rate as illustrated in diagram 304. Similarly, responsive to the magnitude of the changing rate exceeding an exiting threshold, the controller 32 may adjust the feedforward torque compensation by reducing the amount in prevention of overcompensation. It is noted that the magnitude of the enter and exiting threshold may be different depending on the specific design needs. As illustrated in the diagram 304, the exiting threshold has a lesser magnitude compared with the entering threshold.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
an electric machine configured to propel the vehicle; and
a controller programmed to,
while only front wheels of the vehicle are on a ramp being entered and climbed by the vehicle and a first ramp compensation torque is being commanded to the electric machine, reduce the first ramp compensation torque responsive to a rate of increase of the first ramp compensation torque exceeding a first rate threshold, and
while only rear wheels of the vehicle are on the ramp and a second ramp compensation torque is being commanded to the electric machine, responsive to a rate of decrease of the second ramp compensation torque exceeding a second rate threshold, reduce the second ramp compensation torque.

2. The vehicle of claim 1, wherein a magnitude of the first rate threshold is greater than a magnitude of the second rate threshold.

3. The vehicle of claim 1, wherein the controller is further programmed to operate the vehicle in a one-pedal drive mode during the reduction.

4. The vehicle of claim 3, wherein the controller is further programmed to selectively exit the one-pedal drive mode.

5. The vehicle of claim 1, wherein the rate is a quotient of the first ramp compensation torque and a distance traveled.

6. A method comprising:
applying a first ramp compensation torque to an electric machine of a vehicle operating in a one-pedal drive mode while entering a ramp climb; and
responsive to a rate of increase of the first ramp compensation torque exceeding a first rate threshold, reducing the first rate compensation torque such that the rate becomes less than the first rate threshold, wherein the rate is a quotient of the first ramp compensation torque and a distance traveled.

7. The method of claim 6, further comprising:
applying a second ramp compensation torque to the electric machine while exiting the ramp climb; and
responsive to a rate of decrease of the second ramp compensation torque exceeding a second rate threshold, reducing the second rate compensation torque such that the rate of decrease becomes less than the first rate threshold.

8. The method of claim 7, wherein a magnitude of the first rate threshold is greater than a magnitude of the second rate threshold.

9. The method of claim 6, further comprising:
selectively exiting the one-pedal drive mode.

10. A powertrain system of a vehicle, comprising:
a controller programmed to, while operating the vehicle in a one-pedal drive mode, responsive to detecting front wheels of the vehicle having entered a ramp and rear wheels of the vehicle not having entered the ramp, command a first torque compensation to an electric machine, and responsive to an increase of the first torque compensation at a rate exceeding a first threshold, reduce a magnitude of the first torque compensation until the rear wheels have entered the ramp.

11. The powertrain system of claim 10, wherein the controller is further programmed to, while operating the vehicle in the one-pedal drive mode, responsive to detecting front wheels of the vehicle having exited the ramp and rear wheels of the vehicle not having exited the ramp, command a second torque compensation to the electric machine, and responsive to decrease of the second torque compensation at a rate exceeding a second threshold, reduce a magnitude of the second torque compensation until the rear wheels have exited the ramp.

12. The powertrain system of claim 11, wherein a magnitude of the first threshold is greater than a magnitude of the second threshold.

13. The powertrain system of claim 10, wherein the controller is further programmed to operate the vehicle in a one-pedal drive mode during the reduction.

14. The powertrain system of claim 13, wherein the controller is further programmed to selectively exit the one-pedal drive mode.

15. The powertrain system of claim 10, wherein the rate is a quotient of the first compensation torque and a distance traveled.

\* \* \* \* \*